(12) United States Patent
Vandenameele

(10) Patent No.: US 8,199,054 B2
(45) Date of Patent: Jun. 12, 2012

(54) METHOD FOR ESTIMATING DISTANCE BETWEEN TRANSMITTER AND RECEIVER, AND TRANSMITTER AND RECEIVER IMPLEMENTING SAME

(75) Inventor: Patrick Vandenameele, Bertem (BE)

(73) Assignee: Essensium, Leuven (BE)

(*) Notice: Subject to any disclaimer, the term of this patent is extended or adjusted under 35 U.S.C. 154(b) by 594 days.

(21) Appl. No.: 12/158,519

(22) PCT Filed: Dec. 20, 2006

(86) PCT No.: PCT/EP2006/070040
§ 371 (c)(1),
(2), (4) Date: Jun. 20, 2008

(87) PCT Pub. No.: WO2007/071748
PCT Pub. Date: Jun. 28, 2007

(65) Prior Publication Data
US 2008/0291090 A1 Nov. 27, 2008

(30) Foreign Application Priority Data
Dec. 23, 2005 (EP) .................................... 05112981

(51) Int. Cl.
*G01S 3/02* (2006.01)
*G01S 13/00* (2006.01)

(52) U.S. Cl. .............................. 342/458; 342/82; 342/89
(58) Field of Classification Search .................... 342/82, 342/85, 89, 98, 458; 375/303, 335, 347
See application file for complete search history.

(56) References Cited

U.S. PATENT DOCUMENTS
5,640,385 A   6/1997   Long et al.
5,960,047 A   9/1999   Proctor, Jr. et al.
6,285,885 B1  9/2001   Honda

FOREIGN PATENT DOCUMENTS
JP   2003287567   10/2003
WO   WO 02088776  11/2002

*Primary Examiner* — Dao Phan
(74) *Attorney, Agent, or Firm* — Jerold I. Schneider

(57) ABSTRACT

A method for estimating the distance between a transmitter and at least one receiver. The transmitter has radio transmission circuitry, at least part of which is operable in a first operation mode for transmitting a first signal type within a first bandwidth and in a second operation mode for transmitting a second signal type including at least a ranging component which occupies a second bandwidth which encompasses and exceeds the first bandwidth. The method includes the steps of: (i) operating part of the radio transmission circuitry in a second operation mode, (ii) transmitting a signal of a second signal type, (iii) receiving a signal on one receiver and (iv) estimating the distance between the transmitter and a receiver from the ranging component in each received signal. A suitable transmitter and receiver for implementing the method are described.

19 Claims, 2 Drawing Sheets

METHOD FOR ESTIMATING DISTANCE BETWEEN TRANSMITTER AND RECEIVER, AND TRANSMITTER AND RECEIVER IMPLEMENTING SAME

CROSS REFERENCE TO RELATED APPLICATIONS

This application is the entry into the United States of PCT Application Number PCT/EP2006/070040 filed Dec. 20, 2006 and claims priority from European Patent Application Number EP/05112981.5 filed Dec. 23, 2005, the entirety of each of which are hereby incorporated by reference.

BACKGROUND OF INVENTION

1. Technical Field

The present invention relates to a method for estimating the distance (also referred to as range) between a transmitter and a receiver, and to a transmitter and a receiver in which the method is implemented.

2. Background Art

Position determination is an important feature for many applications of wireless networks. It has been proposed either as an additional feature to add value to wireless communication networks (such as enhanced routing or ease in installation for wireless sensor networks) or as a stand-alone feature when location awareness is a goal in itself (such as asset or person tracking applications). More specifically, there is a growing interest to provide position determination features in indoor environments.

Well-established technologies for position determination are mostly addressing outdoor scenarios. Well-known examples are the Global Positioning System (GPS) (see for example Wellenhoff, B., Colli, J., and Lichtenegger, H., "*Global positioning system: theory and practice*" 4th ed. Springer, 1997) and E-911 for positioning of emergency calls in cellular networks (see for example Sun, G., Chen, J., Guo, W., Ravazi, B., "Signal Processing techniques in network-aided positioning". *Signal Processing Magazine IEEE*, Vol. 22 No. 4, pp 12-23, July 2005). In the case of GPS, positioning is based on the estimated time-of-flight of signals transmitted by a satellite constellation and as received by the positioning device. In the case of E-911, positioning is typically based on the observed attenuation of the signals exchanged by the terminal and multiple base stations in the cellular network. While these techniques have adequate performance outdoors and when a sufficiently strong line-of-sight signal is available, they suffer low accuracy in indoor environment. The key reason for this performance degradation is the higher number of reflections and often obstructed line-of-sight path, aka multi-path propagation, which complicates the estimation of the so-called time-of-arrival and hence time-of-flight of the transmitted signal. The reason is that the received signals consists of multiple superimposed attenuated, delayed and phase rotated copies of this signal. Especially due to the narrow-band nature of the transmitted signals, these copies have a wide span in the time-domain and hence tend to overlap. As a result, copies having travelled several meters more than the line-of-sight path can typically not be separated from the latter by the receiver and induce errors in the position estimate of the same order of magnitude.

In order to enable accurate position determination in indoor environments with rich multi-path propagation, techniques based on ultra-wideband signalling have been proposed, for example by Kegen Yu, Oppermann, "UWB Positioning for Wireless Embedded Networks" *IEEE Radio and Wireless Conference,* 2004, pp 459-462, September 2004, and Gezici, S., Tian, Z., Giannakis, G., Kobayashi, H., Molisch, A., Poor, V. and Sahinoglu, Z., "Localization via Ultra-Wideband Radios" *Signal Processing Magazine IEEE* Vol. 22 No 4, pp 70-84, July 2005. In this case, the transmitted signals feature a very short span in the time-domain and hence provide improved resolution for separating the line-of-sight propagated copy from the reflected copies of the transmitted signal at the receiver. However, ultra-wideband signalling has serious disadvantages with respect to classical narrowband communication when it comes to the link budget. Specifically, the signal-to-noise ratio at the receiver gets proportionally worse as the bandwidth increases, due to the increased in-band noise bandwidth. Due to this, and also the high carrier frequency at which ultra-wideband communication usually takes place, due to regulatory constraints, the power consumption of such system tends to be significantly higher than that of classical narrowband systems.

Several technologies have been proposed that combine the advantages of both ultra-wideband and narrowband signals for their superior properties with respect to distance estimation accuracy and communication efficiency and simplicity respectively. In U.S. Pat. No. 5,960,047 an alerting signal is sent using a narrowband transmitter, along with the ultra-wideband signal used for distance estimation. It exploits the better link budget provided by narrowband communications to simplify the discovery and improve the range of the ultra-wideband ranging signals. In WO-A-02/088776, again a narrowband transceiver is combined with an ultra-wideband transceiver. In this system, the narrowband signal is used for low-rate data communication, again typically for discovery purposes, whereas the ultra-wideband signal is used for ranging.

The systems known from U.S. Pat. No. 5,960,047 and WO-A-02/088776 however have the following disadvantages. Firstly, they need fully separated radio-transceiver devices for transmitting and receiving the narrowband communications and wide-band ranging signals. Secondly, the signalling happens in distinct frequency bands. Thirdly, the ranging transmissions are in no way backward compatible to the existing means of narrowband communications on top of which they are implemented.

SUMMARY OF INVENTION

It is an aim of the present invention to provide a method for estimating the distance between a transmitter and a receiver, with which the need for separate radio-transceiver devices for the communications and ranging signals can be avoided.

This aim is achieved according to the invention with the method showing the steps of claim 1.

It is a further aim of the present invention to provide a transmitter and receiver for implementing the method of claim 1.

This further aim is achieved according to the invention with the transmitter and receiver showing the technical characteristics of the other independent claims.

The following disclosure relates to the method as well as to the transmitter and the receiver of the invention.

According to the invention, radio transmission circuitry is used which is operable in at least two modes. In a first mode, first signals of a first type are transmitted within a first bandwidth and in a second mode, second signals of a second type are transmitted. These second signals comprise at least a ranging component occupying a second bandwidth encompassing and exceeding the first bandwidth.

According to the invention, the second bandwidth of the ranging component encompasses the first bandwidth of the first type of signals, which means that the first signals are transmitted in a portion of the bandwidth which is used for the ranging component. This makes it possible to use the same radio transceiver device for transmitting/receiving both types of signals. More particularly, a part of the radio transceiver circuitry, which is actually designed for the first signals within the first bandwidth, can now be used for also transmitting the ranging component, for example by manipulating some of its control ports using high-speed. In other words, this invention allows upgrading existing systems designed for wireless communication with an accurate ranging capability by exploiting the fact that at least part of the transceiver circuitry is capable of transmitting signals with a wider bandwidth.

In a preferred embodiment of the invention, the radio transmission/receiver circuitry comprises a baseband part and an RF part, the latter being the part which is used for the ranging signals.

In a preferred embodiment of the invention, the ranging component is generated by controlling at least one component of the RF part of the radio transmission circuitry. This component can for example be a power amplifier, a mixer and/or a switch, or any other component of the RF part.

The first signal type may for example comprise pure communication signals, whereas the second signal type may comprise a composite signal with a communication component next to the ranging component. For communication, a relatively narrow bandwidth is desirable in view of simplicity, power-efficiency and communication range (more narrow communication bands and availability of unlicensed spectrum at relatively low center frequencies). For ranging (being estimation of the distance between transmitter and receiver, or more in general between a transmitter and multiple receivers) wider bandwidths have more attractive properties in view of a finer temporal resolution which allows to separate between the distinct multi-path components, whereas for narrower bandwidths the temporal waveforms are smeared and hence provide poor resolution. As a result it is desirable that the second bandwidth exceeds the first bandwidth.

In a preferred embodiment of the invention, the ranging signal is interpreted by feeding the received signal to a positioning engine without filtering its bandwidth to the first bandwidth. The distance estimation preferably comprises the step of determining a time of arrival of the received signal with respect to a time stamp, which is a possible ranging component according to the invention. In a preferred embodiment, the received signal may be sent back to the transmitter to make the time of arrival determination more accurate. In that case, the transmission time and the treatment time on receiver side are taken into account when comparing the time of arrival at the original transmitter with the original time stamp. In an alternative embodiment, the signal with the ranging component may be sent to multiple, synchronised receivers and a time difference of arrival approach may be used. Time of arrival and time difference of arrival determination techniques are known in the art and therefore need no further explanation here.

The transmitter according to the invention comprises an operating means which acts on the part of the radio transmission circuitry operable in the two described modes. The first and second signal types, even though there bandwidths are different, are transmitted using the same part of the radio transmission circuitry. As mentioned, this part may for example be the RF part.

In a preferred embodiment, the transmitter comprises a communication engine. The baseband part of the radio transmission circuitry is connected to an output of this communication engine and the RF part is connected to an output of the baseband part. In this embodiment, the operating means is formed by a controller which acts on the RF part.

The communication engine preferably comprises a data processor having a first processor speed related to the first bandwidth and the controller preferably comprises a control processor having a second processor speed related to the second bandwidth. The data processor and the control processor are preferably synchronised.

The RF part of the transmitter preferably comprises a mixer, a power amplifier and/or a switch, at least one of which is controlled by the controller. The baseband part preferably comprises an amplifier and a channel filter.

The receiver according to the invention comprises radio receiver circuitry for receiving the first type of signals within the first bandwidth, a part of which is provided for receiving the second type of signals with the ranging component occupying the second bandwidth, which encompasses and exceeding the first bandwidth. In case the first type of signals are pure communication signals and the second type of signals are the composite signals described above, the receiver further comprises a communication signal interpreter for interpreting the received communication signals and a ranging signal interpreter for interpreting the received ranging component.

In a preferred embodiment, the radio receiver circuitry comprises a baseband part and an RF part, the RF part being the part which is provided for receiving said second type of signals. In this embodiment, the communication signal interpreter is connected to an output of the baseband part and the ranging signal interpreter is connected to an output of the RF part.

In all embodiments described above, the first bandwidth is preferably narrow-band (defined as BW<10% F_center AND BW<500 MHz) and the second bandwidth is preferably wideband (defined as BW>10% F_center OR BW>500 MHz). However, this is not essential, any other bandwidths are also possible for the first and second bandwidth, with the limitation that the second bandwidth encompasses and exceeds the first bandwidth. The second bandwidth of the ranging signals may for example also be between 50 and 500 MHz or even smaller.

BRIEF DESCRIPTION OF THE DRAWINGS

The invention will be further elucidated by means of the following description and the appended figures.

DETAILED DESCRIPTION

Figure 1:
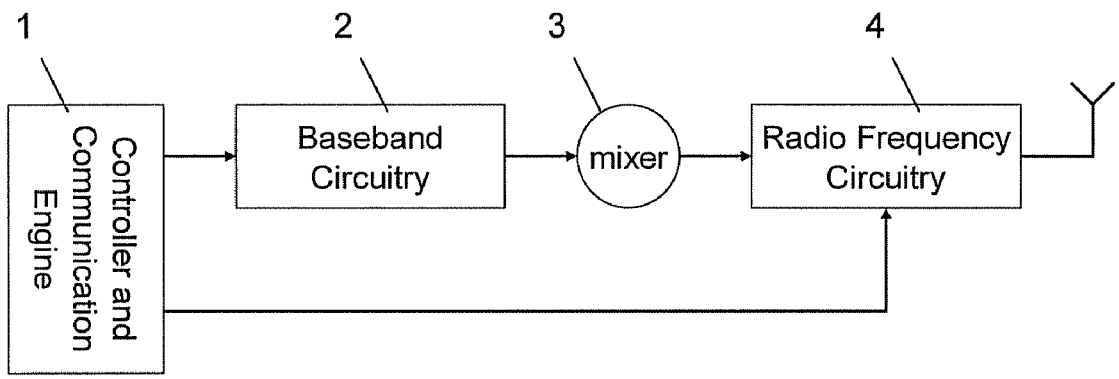
FIG. 1 shows a top-level transmitter architecture according to the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and that the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

So-called narrow-band radio systems (defined as BW<10% F_center AND BW<500 MHz) have attractive properties with respect to simplicity, power-efficiency and communication range (more narrow communication bands and availability of unlicensed spectrum at relatively low center frequencies) compared to wide-band systems (defined as BW>10% F_center OR BW>500 MHz). However, for ranging (being estimation of the distance between transmitter and receiver, or more in general between a transmitter and multiple receivers) wide-band systems have more attractive properties in that their finer temporal resolution allows to separate between the distinct multi-path components, whereas in narrow-band systems the temporal waveforms are smeared and hence provide poor resolution.

Transmitters for narrowband wireless systems typically contain a base band part and a radio frequency part. Due to filter capabilities, they produce parasitic transient behaviours which depending on the particular front-end architecture may or may not have a wider frequency domain spectrum than the actual settled signal has. Examples include the start-up of the mixer and consequent local oscillator feed-through, the power-on ramp of the PA, glitches due to closing the antenna or RX/TX switch etc. The natural reason for this is that the aforementioned functions are usually positioned between the low-pass channel filter and the band-pass band filter, and hence that it is the latter rather than the former bandwidth that determines their frequency content. Note that the band filter is there to make sure regulations such as those set by the FCC/ETSI/JEDEC are met.

According to an embodiment of the invention, the aforementioned parasitics are purposely controlled and exploited in order to improve timing resolution during for example the power-on and/or power-off sequences on every and/or selected transmissions by a radio transmitter. According to the invention, the parasitic state is termed the second operation mode of the radio transmission circuitry part with the normal, non-transient state being termed the first operating mode of this part.

FIG. 1 shows a transmitter according to the invention. In the embodiment shown, the transmitter comprises a combined controller and communication engine 1 with outputs towards baseband circuitry 2 and radio frequency circuitry 4, also called RF part according to the invention. Between baseband circuitry and radio frequency circuitry a mixer 3 is provided to bring the signals to be transmitted to the correct bandwidth for transmission. The second mode of operation in which a signal is generated and transmitted which comprises the ranging component occupying the larger, second bandwidth, is achieved by the controller 1 which purposely controls the RF circuitry 4, which may actually be designed for transmitting within the narrower, first bandwidth only.

Figure 2:
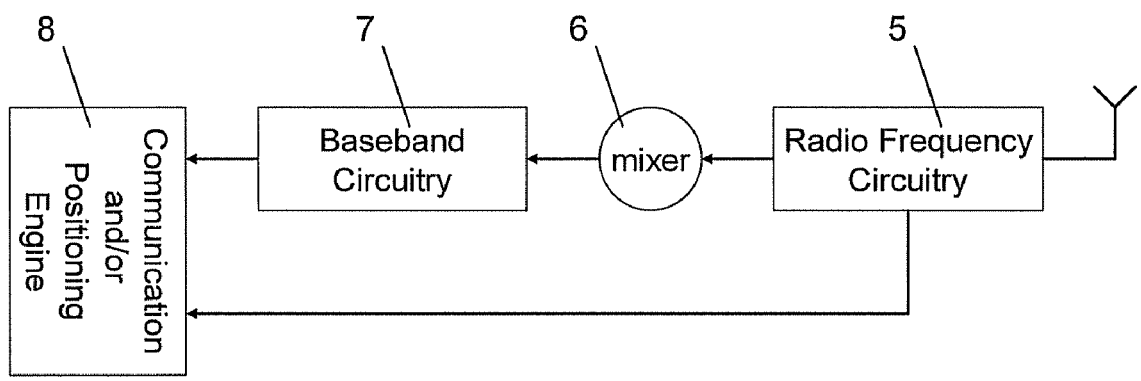
FIG. 2 shows a top-level receiver architecture according to the invention.

FIG. 2 shows a receiver according to the invention. In the embodiment shown, the radio receiver circuitry comprises RF circuitry 5, mixer 6 and baseband circuitry 7. A communication and/or positioning engine 8 is linked to both the RF circuitry 5 and the baseband circuitry 3. Because of the link between the RF circuitry 5 and the engine 8, the ranging component can be retrieved by a direct feed of the received signal, bypassing the mixer 6 and the baseband circuitry 7 which filters received signals to the first, narrower bandwidth.

Figure 3:
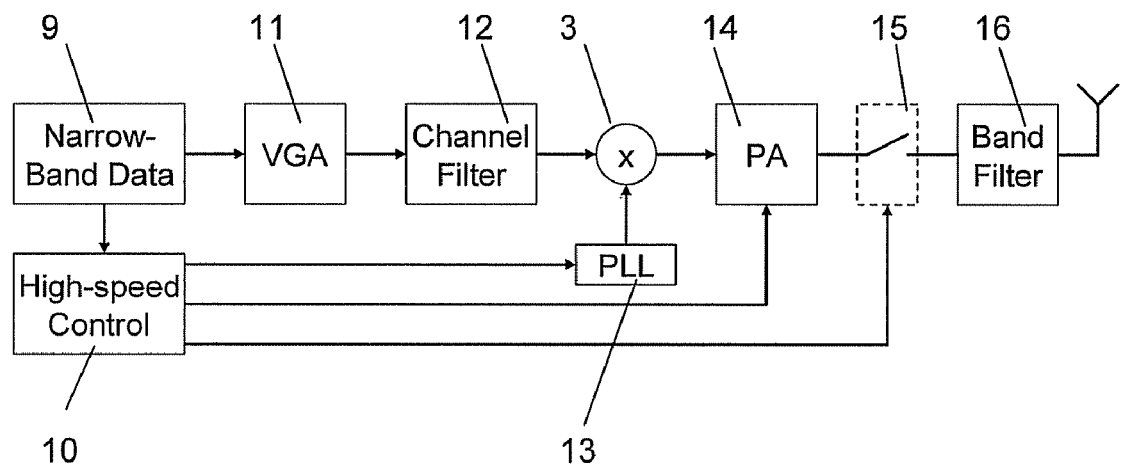
FIG. 3 shows a lower-level transmitter scheme according to the invention.
Figure 4:
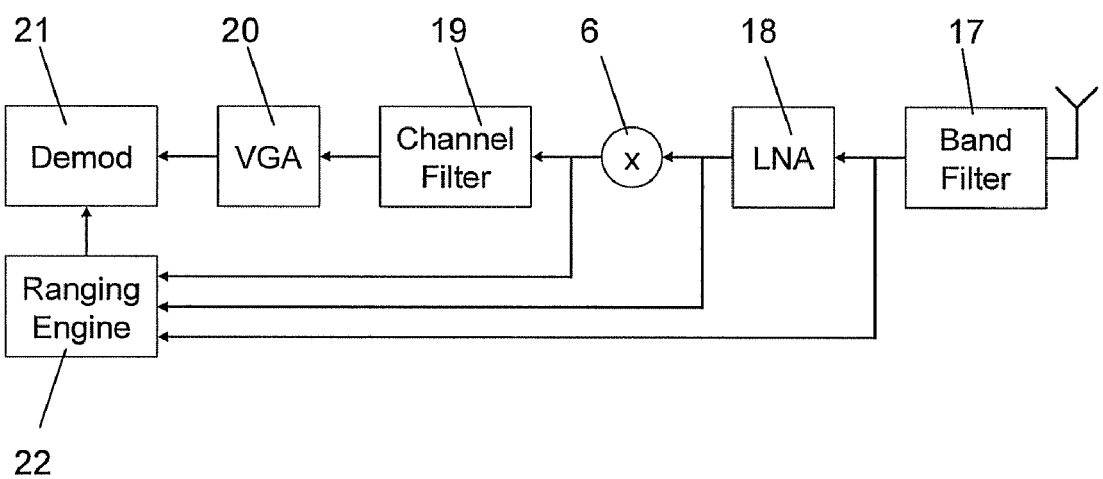
FIG. 4 shows a lower-level receiver scheme according to the invention.

FIGS. 3 and 4 show the transmitter and receiver in greater detail. On transmitter side, the baseband circuitry 2 comprises a Variable Gain Amplifier (VGA) 11 and a channel filter 12 and the RF transmission circuitry 4 is a cascade of a power amplifier 14, a band filter 16 and optionally a switch 15 in between these two. The controller and communication engine 1 comprises a narrow-band data unit 9 for establishing the narrow-band communication signals, i.e. the first signal type) and a high-speed control unit 10 which purposely controls the mixer 3 via a phase-locked loop 13 and/or the power amplifier 14 and/or the switch 15. On receiver side, the baseband circuitry 7 comprises a channel filter 19 and a VGA 20 and the RF receiver circuitry 5 comprises a band filter 17 and a low-noise amplifier 18. The communication and/or positioning engine 8 comprises a demodulator 21 and a ranging engine 22. The latter may be directly linked to the output of the mixer 6 and/or the LNA 18 and/or the band filter 17 for retrieving the ranging component from the received signal.

In the above described preferred embodiments of the invention, the following techniques may be employed on transmitter side to generate the ranging component:

controlled timing of the power-on ramp of the PA 14 with respect to the phase of the carrier and the start of the actual communication component to be transmitted;

controlled timing of the RX/TX switching 15 or antenna switching with respect to the phase of the carrier and the start of the actual communication component to be transmitted;

controlled timing of the mixer 3 power-on with respect to the phase of the carrier and the start of the actual communication component to be transmitted;

More in general, the ranging component may be introduced into a narrow-band communication signal by controlled operation of any signal or a combination of signals in the transmitter which enter the signal chain after the low-pass channel filter 12 and before the antenna. On transmitter side, this timing control may involve very high speed interfacing.

On receiver side, a separate wideband signal chain with or without down-conversion and with or without some form of channel filtering is added to extract the timing of the parasitics induced in the transmitter, i.e. to extract the ranging component from the received signal. This wideband signal chain may involve high speed A/D conversion.

As a result, the above described embodiments of the invention make it possible to combine the advantageous properties of both narrow-band communication and high temporal resolution for ranging, in a single device.

In order to demonstrate a practical application of the technology described, an example of its application to WLAN devices is described below.

A typical existing WLAN device comprises a baseband processor, a transceiver and a front-end module. Often the baseband processor and the transceiver are integrated into a single device. It is noteworthy that both the baseband processor and a part of the transceiver (i.e. any circuitry between the baseband processor interface and the so-called channel filter, which filters the bandwidth down to the WLAN channel bandwidth, being about 17 MHz) are narrow-band components, whereas the other part of the transceiver and the front-end module are wideband components (typically spanning the whole band at 2.4-2.5 GHz and/or the band at 4.9-5.8 GHz). In order to apply the ranging technology described herein to a WLAN device, a possible implementation may be as follows.

On transmitter side, an output is added to the baseband processor which delivers a wideband control signal (the timing of which is correlated with the start of the normal WLAN transmission). This output is used to control one of the wideband components in the transmit chain (whereas in a straightforward existing implementation narrowband signal would be used of which the timing is not known within the tolerance required for ranging), typically the bias control signal of the power amplifier in the front-end module or the control signal for the transmit/receive switch in the front-end module. The result of this is a regular WLAN waveform of which the rising edge is carefully controlled by the wideband control signal.

On receiver side, an input is provided to the baseband processor that allows high-speed sampling the analog/digital converter in order to capture a much wider bandwidth than the regular input to the baseband processor would provide. The received signal is fed directly into the high-speed sampling baseband input without passing through any of the narrow-band filtering in the transceiver. E.g. the output of the LNA could be used as the input to the baseband input. The ranging component is processed by extracting the time-of-arrival of the received waveform based on the full accuracy of the wideband baseband input. This ranging component is subsequently uses for estimating the distance between transmitter and receiver.

A similar methodology may be applied to other standards such as Bluetooth and/or Zigbee, or any other wireless technology known to the person skilled in the art. Note that the above described modifications can be made in perfect compliance with existing standards, such that the data embedded in the ranging-enhanced transmissions can be received by legacy equipment.

The invention claimed is:

1. Method for estimating the distance between a transmitter and at least one receiver, the transmitter having radio transmission circuitry which is operable which comprises an RF part which is actually designed for operating in a first operation mode for transmitting a first signal type within a first bandwidth but which is also operable in a second operation mode for transmitting a second signal type comprising at least a ranging component which occupies a second bandwidth which encompasses and exceeds the first bandwidth, the method comprising the steps of:
    a) operating said RF part of the radio transmission circuitry in said second operation mode,
    b) transmitting a signal of said second signal type comprising said ranging component by means of said part purposely controlling transient behavior of at least on circuitry component of the RF part of the radio transmission circuitry,
    c) receiving said signal of said second signal type on said at least one receiver,
    d) estimating the distance between said transmitter and each receiver from said ranging component in each received said signal.

2. Method according to claim 1, characterised in that the radio transmission circuitry further comprises a baseband part.

3. Method according to claim 1, characterised in that the at least one circuitry component is a power amplifier, a mixer and/or a switch.

4. Method according to claim 1, characterised in that said first signal type comprises pure communication signals and said second signal type comprises composite signals comprising said ranging component and a communication component.

5. Method according to claim 1, characterised in that step d) comprises feeding the received signal to a positioning engine without filtering its bandwidth to the first bandwidth.

6. Method according to claim 1, characterised in that said ranging component comprises a time stamp and step d) comprises the step of determining a time of arrival of the received signal with respect to the time stamp.

7. Method according to claim 6, characterised in that said signal is sent back to the transmitter before determining said time of arrival.

8. Method according to claim 1, characterised in that said signal is sent to multiple receivers which are in synchronisation with each other and that step d) comprises determining of a time difference of arrival between the multiple received signals.

9. A transmitter comprising radio transmission circuitry, having an RF part which is actually designed for operating in a first operation mode for transmitting a first signal type within a first bandwidth but is also operable in a second operation mode for transmitting a second signal type comprising at least a ranging component which occupies a second bandwidth encompassing and exceeding the first bandwidth, and means for operating said RF part in the second operation mode and purposely controlling transient behaviour of at least one circuitry component of said RF part to generate said ranging component.

10. A transmitter according to claim 9, characterised in that the radio transmission circuitry further comprises a baseband part.

11. A transmitter according to claim 10, further comprising a communication engine, the baseband part being connected to an output of the communication engine, the RF part being connected to an output of the baseband part, the operating means for operating said RF part in the second operation mode being formed by a controller which acts on the RF part.

12. A transmitter according to claim 11, characterised in that the communication engine comprises a data processor having a first processor speed related to the first bandwidth and the controller comprises a control processor having a second processor speed related to the second bandwidth.

13. A transmitter according to claim 12, characterised in that the data processor and the control processor are synchronised.

14. A transmitter according to claim 9, characterised in that the RF part comprises a mixer, a power amplifier and/or a switch, at least one of which is controlled by the controller.

15. A transmitter according to claim 9, characterised in that the baseband part comprises an amplifier and a channel filter.

16. A receiver comprising radio receiver circuitry for receiving a first signal type within a first bandwidth, an RF part of the radio receiver circuitry being provided for receiving a second signal type comprising at least a ranging component occupying a second bandwidth encompassing and exceeding the first bandwidth, the first signal type comprising pure communication signals and the second signal type comprising composite signals comprising a communication component and said ranging component, the receiver further comprising a communication signal interpreter for interpreting signals of the first type and a ranging signal interpreter for interpreting the ranging component in signals of the second type, characterised in that the ranging signal interpreter is directly linked to an output of the RF part.

17. A receiver according to claim 16, characterised in that the radio receiver circuitry comprises a baseband part and in that the communication signal interpreter is connected to an output of the baseband part.

18. A receiver according to claim 16, characterized in that the ranging signal interpreter is directly linked to the output of a mixer and/or an LNA and/or an band filter of the RF part for retrieving the ranging component from the received signal.

19. A receiver according to claim 16, characterized in that the ranging signal interpreter is part of a separate wideband signal chain involving high speed A/D conversion for extracting the ranging component from the received signal.

* * * * *